UNITED STATES PATENT OFFICE.

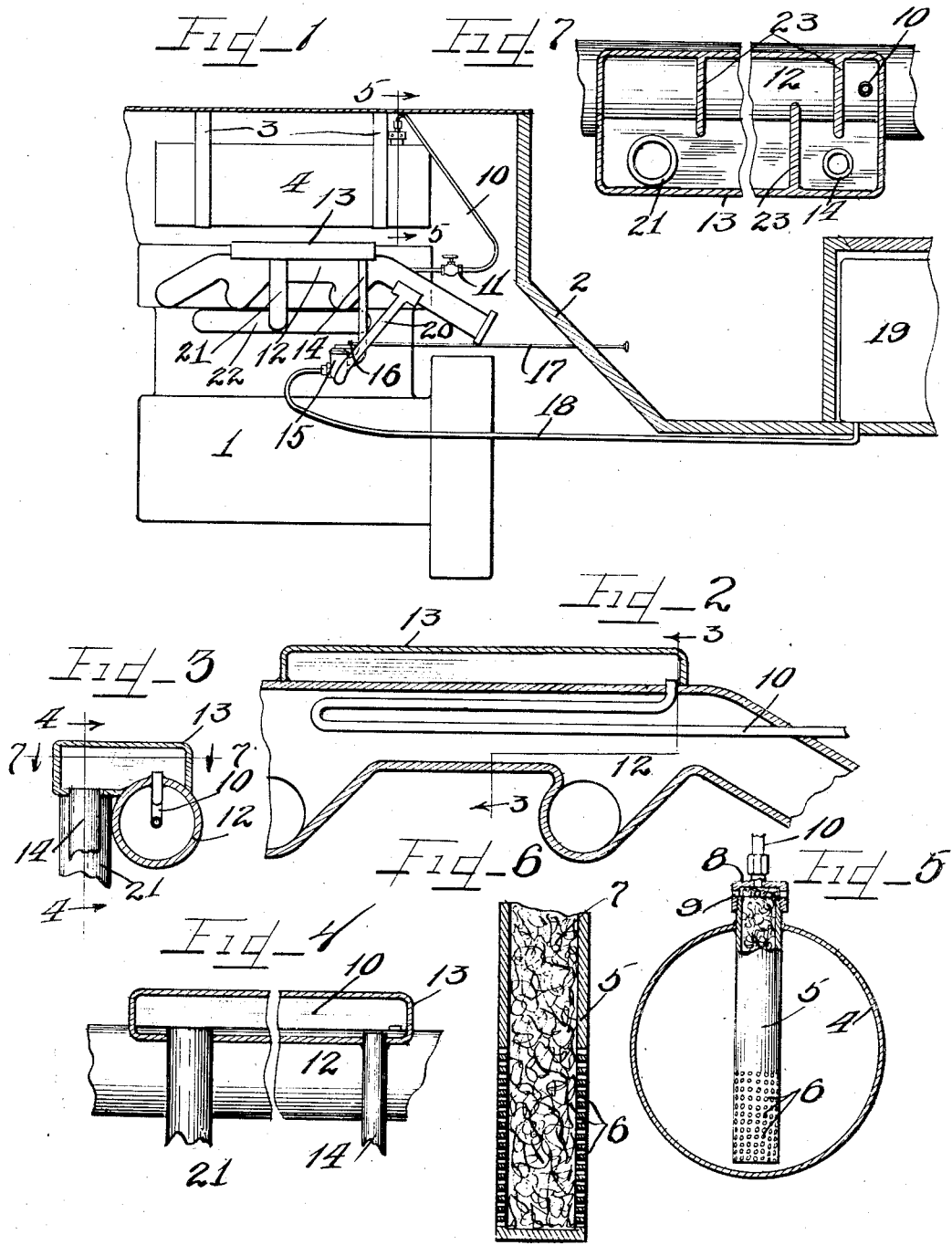

JOHN W. DUNTLEY, OF CHICAGO, ILLINOIS.

HYDROPNEUMATIC FUEL-MIXING APPARATUS.

1,357,039.  Specification of Letters Patent.  Patented Oct. 26, 1920.

Application filed February 12, 1917. Serial No. 148,031.

*To all whom it may concern:*

Be it known that I, JOHN W. DUNTLEY, a citizen of the United States, and a resident of the city of Chicago, in the county of Cook and State of Illinois, have invented certain new and useful Improvements in Hydropneumatic Fuel-Mixing Apparatus; and I do hereby declare that the following is a full, clear, and exact description of the same, reference being had to the accompanying drawings, and to the numerals of reference marked thereon, which form a part of this specification.

This invention relates to a means of forming a combustible mixture of gases for introduction into a hydro-carbon engine or for any other use, by bringing together a hydro-carbon fuel, air, and water or steam, and passing the same into a heated chamber in which the mixture is produced and then admitted to the manifold for introduction into the cylinders of the engine.

By using my invention, in connection with a hydro-carbon engine, the efficiency of operation of the engine is greatly improved, as compared with the usual operation thereof by means of a conventional type of carbureter, which admits an air and fuel mixture into the manifold. Furthermore, due to the more perfect combustion obtained by the use of my invention, carbon deposits are obviated, and an efficient and easy running engine assured.

It is an object therefore, of this invention to construct an apparatus for example adapted for use with a hydro-carbon engine whereby fuel, air, and water or steam are brought together in a heated chamber to form a combustible mixture of gases for introduction into the cylinders of an engine.

It is also an object of this invention to construct a structure embracing a fuel mixing valve, and a superheated air and moisture inlet apparatus to introduce the superheated steam and air into a heated chamber, together with the fuel from said mixing valve, and permitting passage of the gas formed in the chamber to the cylinders of the engine or into other means for combustion for any purpose whatsoever.

It is a further object of this invention to construct a gas mixing and fuel economizing device comprising a fuel inlet means, an air inlet means, and a heated water inlet for introduction of fuel, air and steam into a heated chamber and shown associated with the exhaust manifold of an engine, although of course any other heat source could be used, and from there passing the mixture of gases formed therein into the intake manifold for introduction into the cylinders of the engine.

Other and further important objects of my invention will be evident from the disclosure in the drawings and specification.

The invention (in a preferred form) is illustrated in the drawings and hereinafter more fully described.

On the drawings:

Figure 1 is a diagrammatic view illustrating the installation of a device embodying the principles of my invention upon a motor car hydro-carbon engine.

Fig. 2 is an enlarged, fragmentary, longitudinal vertical section through the exhaust manifold showing the heating chamber associated therewith.

Fig. 3 is a detail section taken on line 3—3 of Fig. 2.

Fig. 4 is a detail section taken on line 4—4 of Fig. 3.

Fig. 5 is a detail section on line 5—5 of Fig. 1.

Fig. 6 is an enlarged, detail section of a part of the mechanism shown in Fig. 5.

Fig. 7 is a view of a modified form of heating chamber.

As shown on the drawings:

The reference numeral 1, indicates as a whole a hydro-carbon motor, shown in the present instance as mounted in a motor car, a portion of the dash of which is shown fragmentarily and denoted by the reference numeral 2. Suspended in brackets 3, from the hood support or any other suitable means above the motor 1, is a water supply tank 4, but, of course, the actual disposition of the supply tank may vary for different installations.

As shown in detail in Figs. 5 and 6, a tubular member 5, is mounted in upright position in one end of the supply tank 4, and is provided with a number of perforations 6, in the lower end thereof. Said member is filled with an absorbent or wick material 7, which serves to convey the water upwardly through the tubular member 5, by capillary action. A cap 8, is engaged on the upper end of said tubular member 5, and is provided with a plurality of air inlet apertures 9, and connected through the cap is a small outlet pipe 10, which leads downwardly to a shutoff or regulating valve 11, and from said valve leads into and through the exhaust manifold 12, of the motor 1, as shown in detail in Fig. 2.

Said pipe 10, as clearly shown in Fig. 2, extends for almost the entire length of the upper portion of the exhaust manifold 12, and is doubled back upon itself, and is connected through an aperture in said exhaust manifold leading into a chamber formed by a casing member 13, formed on, brazed to, or attached upon said exhaust manifold in any suitable manner. Also leading into said casing 13, adjacent thereto, is an inlet pipe 14, which leads from a hydro-carbon fuel carbureting or controlling valve 15, adapted to control the hydro-carbon supply by a handle 16, which is connected to be operated by a rod or link 17, leading to a convenient point upon the dash 2, of the motor car. A fuel supply pipe 18, leads to said mixing or controlling valve 15, from a reservoir tank 19, and any well known feed of fuel may be used, either gravity, pressure or suction, as desired, to insure a flow of the fuel from the resevoir to the mixing or controlling valve. Also communicating into said valve 15, is a hot air inlet pipe 20, which at its outer end, is connected around the exterior of the exhaust manifold 12, so that the air drawn through said pipe 20, is initially heated by the exhaust pipe. An outlet pipe 21, for the gas formed in the casing 13, is provided at the end opposite from said inlet pipes 10 and 14 and is connected into the intake manifold 22, of the motor 1.

As clearly shown in the modification illustrated, in Fig. 7 the casing 13 is provided with a plurality of baffles 23, therein and due to the fact that the inlets 10 and 14 are at one end of the casing and the outlet 21, at the other end thereof, the entering fluids are caused to thoroughly intermix and are thoroughly heated owing to the tortuous path between the inlets and outlet.

The operation is as follows:

The fuel supply is carried in the reservoir tank 19, and with my gas producing apparatus, a very low grade of fuel may be used, as, for instance, instead of gasolene, ordinary kerosene, or a mixture of gasolene and kerosene, or other hydro-carbons. Fuel is conveyed through the pipe 18, to the controlling valve 15, and the quantity of fuel admitted therethrough is determined by the adjustment of the handle 16, which is actuable by the link or rod 17, leading to a convenient point on the dash of the car.

When the apparatus is in operation, that is, with the motor running, hot air is drawn through the intake pipe 20, to the mixing or controlling valve 15, and mingles with the fuel therein and passes therewith upwardly through the pipe 14, into the casing 13, mounted upon the exhaust manifold 12, of the engine. An additional supply of superheated air and steam is also admitted into the casing 13, from the pipe 10, which passes through the exhaust manifold, and the quantity of mixture may be controlled by the regulating valve 11. This mixture is obtained from the water supply tank 4, from which water is drawn upwardly by capillary action through the wick 7, of the tubular container 5, and also of course by suction and the air is drawn through the inlet apertures 9, at the upper end of the wick, causing vaporization or atomization of the water and passing therewith, into the pipe 10. The water vapor and air mixture flows through the regulating valve 11, and then through that portion of the pipe 10, disposed on the interior of the exhaust manifold 12, shown in Fig. 2, where the mixture is subjected to the intense heat of the exhaust insuring vaporization of all the water into steam at high pressure or practically superheating the steam. This intensely hot mixture of air and steam passes into the casing 13, which is maintained at a high temperature, mixing with the fuel and air admitted thereto through the pipe 14. In the casing the entire mixture is subjected to an intense heat, inasmuch as one wall of the casing as shown is formed by the wall of the exhaust manifold of the engine, and after being conditioned therein the highly heated mixture is drawn through the pipe into the intake manifold and introduced into the cylinders from the intake manifold and in this type of engine is ignited in the usual manner by a spark plug. It has been found that the combustion of the gas is complete and perfect, and no carbon deposit results.

Regulation or control of the operation of the motor 1, is effected by adjustment of the handle 16, of the controlling valve 15, as well as the adjustments of the regulator valve 11, and these may be interconnected for simultaneous adjustments if so desired, from any convenient point upon the dash of the car.

This apparatus whereby air, water and a hydro-carbon are brought together and treated in the manner described is susceptible of many modifications and other uses and I have only shown the same associated with a hydro-carbon engine to illustrate one form of adaptation.

I am aware that various details of construction may be varied through a wide range without departing from the principles of this invention, and I therefore do not purpose limiting the patent granted otherwise than necessitated by the prior art.

I claim as my invention:

In a device of the class described, the combination with a hydrocarbon engine of an exhaust manifold, a chamber mounted thereon, a pipe leading from the carbureter to one end of the chamber, an intake manifold, a connection between the other end of the chamber and the intake manifold, an unheated water reservoir, a wick dipping into the reservoir, means for passing unheated air over the upper part of the wick and a pipe connected with said means and passing through the exhaust manifold to the inlet end of said chamber for heating the moistened air.

In testimony whereof I have hereunto subscribed my name in the presence of two subscribing witnesses.

JOHN W. DUNTLEY.

Witnesses:
 CHARLES W. HILLS,
 HARRY B. COLESTOCK.